United States Patent
Zhou et al.

(10) Patent No.: US 12,519,774 B2
(45) Date of Patent: Jan. 6, 2026

(54) INTEGRATED SYSTEM AND INTEGRATED METHOD BETWEEN MULTI-CLOUD APPLICATIONS

(71) Applicants: DIGIWIN CO., LTD., Shanghai (CN); DATA SYSTEMS CO., LTD., New Taipei (TW)

(72) Inventors: Xiao Zhou, Shanghai (CN); Kuan-Hui Wu, Shanghai (CN); Guoxin Sun, Shanghai (CN)

(73) Assignees: DIGIWIN CO., LTD., Shanghai (CN); DATA SYSTEMS CO., LTD., New Taipei (TW)

(*) Notice: Subject to any disclaimer, the term of this patent is extended or adjusted under 35 U.S.C. 154(b) by 414 days.

(21) Appl. No.: 17/844,073

(22) Filed: Jun. 20, 2022

(65) Prior Publication Data
US 2023/0239288 A1    Jul. 27, 2023

(30) Foreign Application Priority Data
Jan. 26, 2022   (CN) .......................... 202210092178.8

(51) Int. Cl.
  *H04L 9/40*   (2022.01)
(52) U.S. Cl.
  CPC .......... *H04L 63/083* (2013.01); *H04L 63/123* (2013.01)
(58) Field of Classification Search
  CPC .............................. H04L 63/083; H04L 63/123
  See application file for complete search history.

(56) References Cited

U.S. PATENT DOCUMENTS

| | | | | |
|---|---|---|---|---|
| 11,652,702 B2* | 5/2023 | Howley | ................. | G06F 9/541 |
| | | | | 709/220 |
| 2014/0215595 A1* | 7/2014 | Prasad | .................... | G06F 21/41 |
| | | | | 726/8 |
| 2014/0237580 A1* | 8/2014 | Kato | ....................... | H04L 63/08 |
| | | | | 726/9 |
| 2015/0193324 A1* | 7/2015 | McGrath | ................ | H04L 67/34 |
| | | | | 717/127 |
| 2017/0331832 A1* | 11/2017 | Lander | .................. | H04L 63/102 |
| 2020/0014680 A1* | 1/2020 | Gujarathi | ............ | H04W 12/069 |

FOREIGN PATENT DOCUMENTS

| | | | | |
|---|---|---|---|---|
| CN | 103051631 A | * | 4/2013 | |
| CN | 109803057 B | * | 10/2020 | |
| CN | 112235416 A | * | 1/2021 | ............. H04L 67/60 |
| CN | 116049785 A | * | 5/2023 | ............. G06F 21/31 |

* cited by examiner

*Primary Examiner* — John B King
*Assistant Examiner* — Alex D Carrasquillo
(74) *Attorney, Agent, or Firm* — JCIPRNET (57) ABSTRACT

An integrated system including an adapter, a first PaaS module, and a second PaaS module and an integrated method between multi-cloud applications are provided. When a tenant device accesses the first PaaS module so that the first PaaS obtains a login request, the first PaaS module generates first token data according to the login request and provides the first token data to the tenant device. When the tenant device provides login data to a second SaaS module to log in to the second SaaS module for the first time, the second SaaS module provides the login data to the adapter. The adapter verifies and parses the login data to generate the first token data and tenant information, obtains second token data according to the tenant information, and maps the second token data to the first token data. The integrated system and the integrated method can efficiently integrate the SaaS modules.

12 Claims, 6 Drawing Sheets

INTEGRATED SYSTEM AND INTEGRATED METHOD BETWEEN MULTI-CLOUD APPLICATIONS

CROSS-REFERENCE TO RELATED APPLICATION

This application claims the priority benefit of China patent application no. 202210092178.8, filed on Jan. 26, 2022. The entirety of the above-mentioned patent application is hereby incorporated by reference herein and made a part of this specification.

BACKGROUND

Technical Field

The disclosure relates to an integrated system; more particularly, the disclosure relates to an integrated system and an integrated method between multi-cloud applications.

Description of Related Art

In the past, when enterprises built their exclusive software-as-a-service (SaaS) applications on private clouds with cloud architecture, the development cost from scratch was significant, and thus most of the enterprises introduce mature software as service applications through outsourcing, and different SaaS applications may be introduced from multiple system service providers. However, these applications also support their owned platform-as-a-service (PaaS) modules, such as authentication modules, authorization modules, and so on. Hence, conventional multi-cloud application systems are required to establish individual user accounts and management systems, respectively; even if the user is the same person, the conventional multi-cloud application systems still need to establish different corresponding accounts and manage them individually. As a result, the system management and operation costs of the multi-cloud application systems adopted by the enterprises are excessively high, and the multi-cloud application systems are very user-unfriendly and inconvenient for users in the enterprises.

SUMMARY

The disclosure provides an integrated system and an integrated method between multi-cloud applications capable of effectively integrating a plurality of SaaS modules, so that a tenant is allowed to operate the SaaS module with ease in a secure manner.

According to an embodiment of the disclosure, an integrated system between multi-cloud applications includes an adapter, a first PaaS module, and a second PaaS module. The adapter is connected to a first SaaS module and a second SaaS module. The first PaaS module is connected to the adapter and the first SaaS module. The second PaaS is connected to the adapter and the second SaaS module. When a tenant device accesses the first PaaS module, so that the first PaaS module obtains a login request provided by the tenant device, the first PaaS module generates first token data according to the login request and provides the first token data to the tenant device. When the tenant device provides login data including the first token data to the second SaaS module to log in to the second SaaS module for the first time, the second SaaS module provides the login data to the adapter. The adapter verifies and parses the login data to generate the first token data and tenant information. The adapter obtains second token data through the second PaaS module according to the tenant information, and the adapter maps the second token data to the first token data.

According to another embodiment of the disclosure, an integrated method between multi-cloud applications includes following steps. When a tenant device accesses a first PaaS module, a login request provided by the tenant device is obtained by the first PaaS module. First token data are generated according to the login request by the first PaaS module. The first token data are provided to the tenant device by the first PaaS module. When the tenant device provides login data including the first token data to a second SaaS module to log in to the second SaaS module for the first time, the login data are provided to the adapter by the second SaaS module. The login data are verified and parsed by the adapter to generate the first token data and tenant information. Second token data are obtained according to the tenant information by the adapter through the second PaaS module. The second token data are mapped to the first token data by the adapter.

In view of the above, in the integrated system and the integrated method between the multi-cloud applications provided in one or more embodiments of the disclosure, the adapter may be disposed at a PaaS layer to effectively integrate a plurality of SaaS modules disposed at a SaaS layer. Thereby, the tenant is allowed to connect the SaaS modules with ease in a secure manner through the PaaS modules disposed in the PaaS layer.

To make the above more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to exemplary embodiments of the disclosure, examples of which are illustrated in the accompanying drawings. Wherever possible, the same reference numerals are used in the drawings and the description to refer to the same or similar parts.

Figure 1:
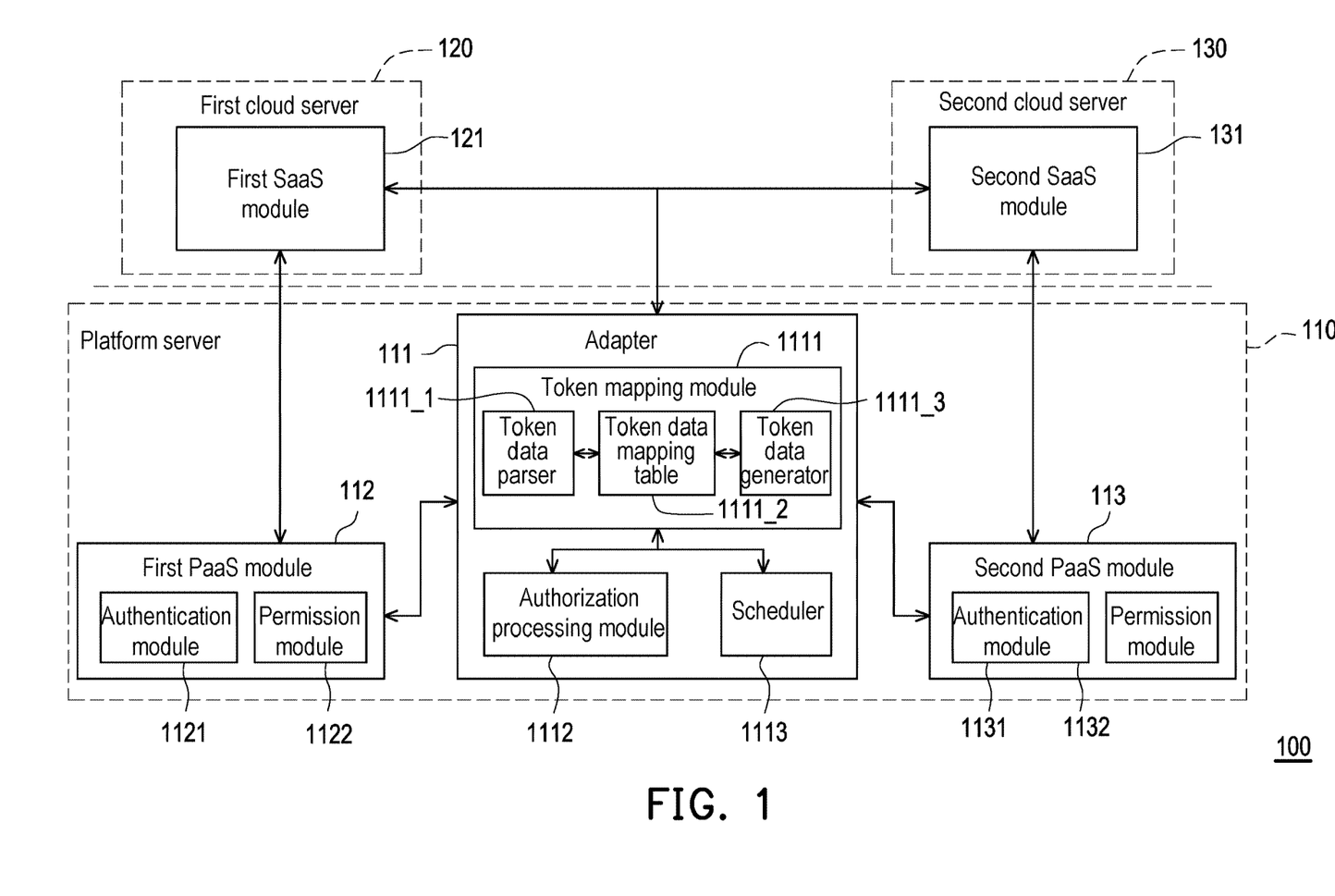
FIG. 1 is a schematic view of an integrated system between multi-cloud applications according to an embodiment of the disclosure.

FIG. 1 is a schematic view of an integrated system between multi-cloud applications according to an embodiment of the disclosure. With reference to FIG. 1, an integrated system 100 includes an adapter 111 arranged at a platform server, a first PaaS module 112, a second PaaS module 113, a first SaaS module 121 arranged at a first cloud server 120, and a second SaaS module 131 arranged at a second cloud server 130. In an embodiment, the first SaaS module 121 and the second SaaS module 131 may also be arranged in the same server. In this embodiment, the adapter 111 may be connected (coupled) to the first PaaS module 112, the second PaaS module 113, the first SaaS module 121, and the second SaaS module 131. The first PaaS module 112 may be connected (coupled) to the first SaaS module 121. The second PaaS module 113 may be connected (coupled) to the second SaaS module 131. In this embodiment, the first SaaS module 121 and the second SaaS module 131 may be configured to provide different application interface (API) services, respectively.

In this embodiment, a tenant (or referred to as a user) may execute the adapter 111, the first PaaS module 112, and the second PaaS module 113 of the platform server 110 through a personal computer (PC), a tablet, a server, or any other tenant device capable of performing computing functions, and the tenant may operate the platform server 110 for connection and to execute the first SaaS module 121 and the second SaaS module 131 through a corresponding application programming interface (API). In this embodiment, the platform server 110, the first cloud server 120, and the second cloud server 130 may include a processing unit and a storage unit, respectively. The processing unit may, for instance, include a central processing unit (CPU) or any other programmable general or special purpose microprocessor, digital signal processor (DSP), application specific integrated circuit (ASIC), programmable logic device (PLD), another similar processing circuit, or a combination thereof. The storage unit may be a memory, such as a non-volatile memory (NVM). The storage unit may store relevant programs, units, modules, or algorithms for the processing unit to access and then execute and achieve relevant functions and operations provided in one or more embodiments of the disclosure.

In this embodiment, the adapter 111 includes a token mapping module 1111, an authorization processing module 1112, and a scheduler 1113. The token mapping module 1111 includes a token data parser 1111_1, a token data mapping table 1111_2, and a token data generator 1111_3. The first PaaS module 112 includes an authentication module 1121 and a permission module 1122. The second PaaS module 113 includes an authentication module 1131 and a permission module 1132. In this embodiment, the authentication module 1121 and the permission module 1122 of the first PaaS module 112 may serve to manage tenant login permission and tenant identity authentication of the first SaaS module 121. Specifically, when the tenant device is connected to the first SaaS module 121 through executing the first PaaS module 112, the authentication module 1121 may be connected to the first SaaS module 121 to call an authorization interface, so as to obtain authorization data provided by the first SaaS module 121. Next, the first PaaS module 112 may store (save) the authorization data, and the permission module 1122 may use the authorization data, so as to be connected to the first SaaS module 121 to determine whether the authorization is legitimate. The authentication module 1131 and the permission module 1132 of the second PaaS module 113 may serve to manage the tenant login permission and the tenant identity authentication of the second SaaS module 131, and the specific implementation method may be derived from said method of operating the authentication module 1121 and the permission module 1122 of the first PaaS module 112. In this embodiment, the authorization processing module 1112 of the adapter 111 may pre-obtain basic authorization data, added authorization data, administrator authorization data, and so on, so that the token mapping module 1111 may establish a tenant token mapping relationship between the first SaaS module 121 and the second SaaS module 131 based on the previous authorization, whereby the tenant identity authentication and the tenant login permission between the first SaaS module 121 and the second SaaS module 131 may be synchronized. In addition, the scheduler 1113 may serve to determine whether the token data expire (fail). In addition, the token data provided in each embodiment of the disclosure may include user information, encryption key information, and relevant data information.

Figure 2:
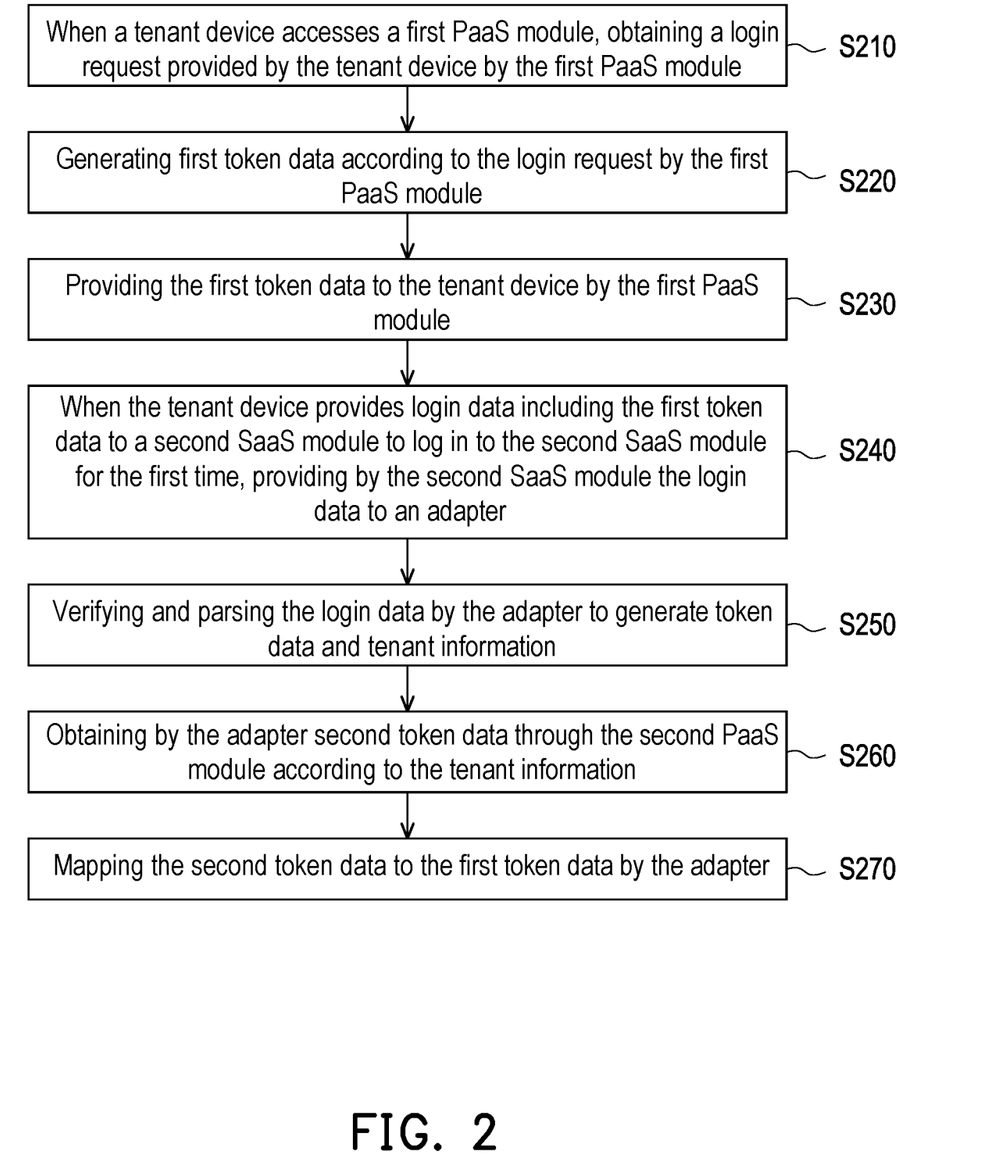
FIG. 2 is a flowchart of an integrated method between multi-cloud applications according to an embodiment of the disclosure.

FIG. 2 is a flowchart of an integrated method between multi-cloud applications according to an embodiment of the disclosure. With reference to FIG. 1 and FIG. 2, the integrated system 100 may execute steps S210-S270 as follows. In step S210, when the tenant device accesses the first PaaS module 112, the first PaaS module 112 may obtain a login request provided by the tenant device. In step S220, the first PaaS module 112 may generate first token data according to the login request. In step S230, the first PaaS module 112 may provide the first token data to the tenant device. In step S240, when the tenant device provides login data including the first token data (e.g., further including the user information, such as a user account, a user password, and so on) to the second SaaS module 131, so that the second SaaS module 131 may provide the login data to the adapter 111 at the first time of logging in to the second SaaS module 131. In step S250, the token data parser 1111_1 of the adapter 111 may verify and parse the login data, so that the token data generator 1111_3 may generate token data and tenant information. In step S260, the adapter 111 may obtain second token data through the second PaaS module 131 according to the tenant information. The second token data refer to a second passing token. In step S270, the adapter 111 may map the second token data to the first token data in the token data mapping table 1111_2. The first token data includes a first encryption key and the tenant information, and the second token data includes a second encryption key and the tenant information. Thereby, the integrated system 100 may effectively synchronize the tenant identity authentication and the tenant login permission between the first SaaS module 121 and the second SaaS module 131. Moreover, in an embodiment, the tenant may also synchronize the tenant identity authentication and the tenant login permission between the first SaaS module 121 and the second SaaS module 131 through the second PaaS module 113. Therefore, the tenant device may log in to the second SaaS module 131 by using the tenant identity information and the tenant login permission originally used for logging in to the first SaaS module 121, so as to access the second SaaS module 131 with ease in a secure manner.

Figure 3:
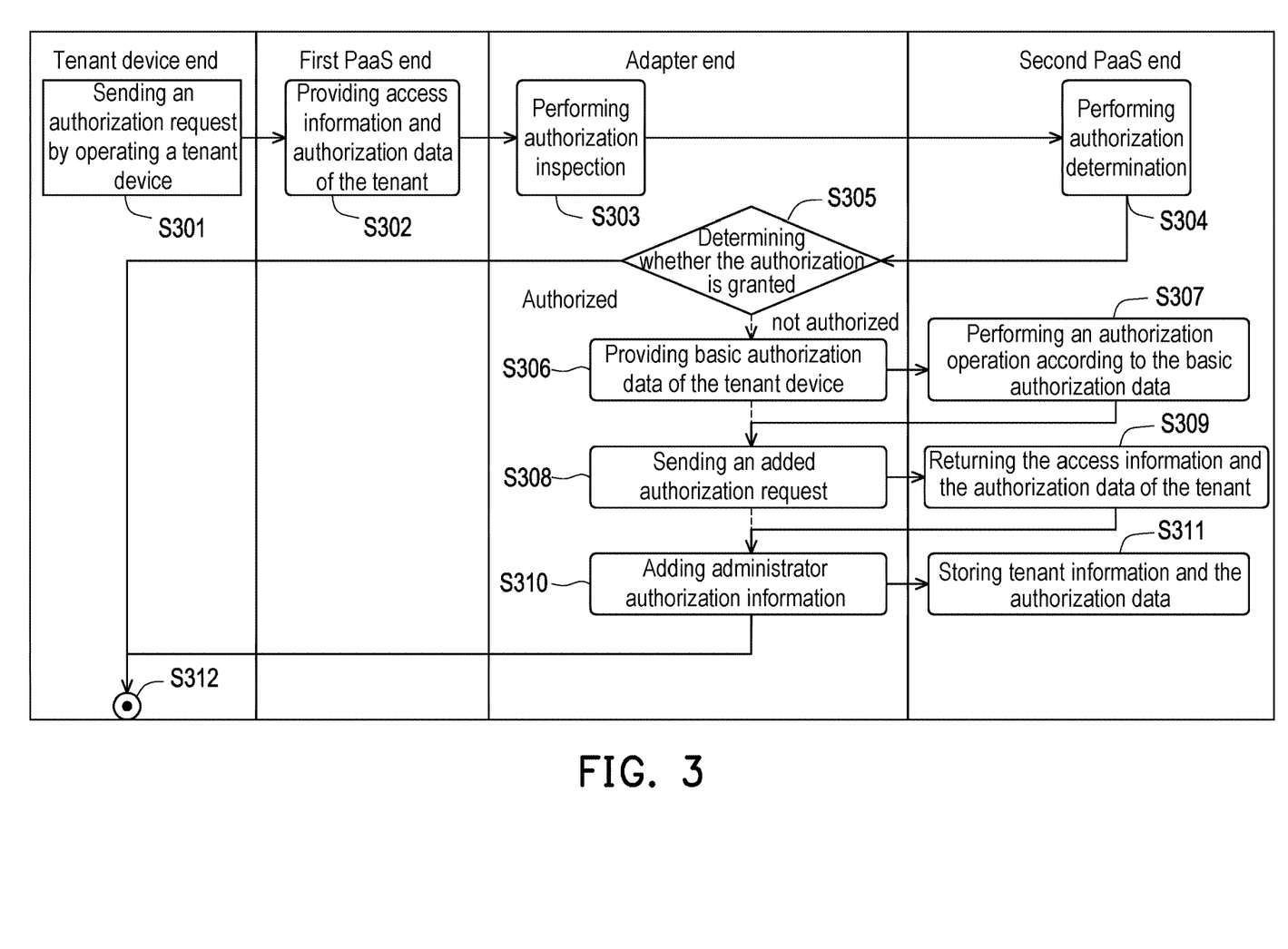
FIG. 3 is a flowchart of an authorization operation according to an embodiment of the disclosure.

FIG. 3 is a flowchart of an authorization operation according to an embodiment of the disclosure. With reference to FIG. 1 and FIG. 3, the authorization operation of the integrated method between multi-cloud applications is elaborated hereinafter in steps S301-S311. In step S301, the tenant may send an authorization request to the first PaaS module 112 by operating the tenant device. In step S302, the permission module 1122 of the first PaaS module 112 may provide access information and authorization data of the tenant to the adapter 111, such as the tenant information, the basic authorization data, the added authorization data, the administrator authorization data, and so forth. In step S303, the authorization processing module 1112 of the adapter 111 may access the second PaaS module 113 for performing authorization inspection. In step S304, the permission module 1132 of the second PaaS module 113 may perform authorization determination and feed determination information back to the adapter 111. In step S305, the authorization processing module 1112 of the adapter 111 may determine whether the authorization is granted. When the adapter 111 determines that the tenant device has been authorized, in step S312, the adapter 111 notifies the tenant device and ends the authorization operation. When the adapter 111 determines that the tenant device is not authorized, in step S306, the adapter 111 provides the basic authorization data of the tenant device to the second PaaS module 113. In step S307, the authorization processing module 1112 of the second PaaS module 113 performs an authorization operation according to the basic authorization data. In step S308, the adapter 111 sends an added authorization request to the second PaaS module 113. In step S309, the authorization processing module 1112 of the second PaaS module 113 returns the access information and/or the authorization data of the tenant to the adapter 111 according to the added authorization request. In step S310, the adapter 111 may add the administrator authorization information to the access information and/or the authorization data of the tenant and may then return to the second PaaS module 113. The adapter 111 may store final authorization information and relevant tenant information. In step S311, the second PaaS module 113 stores the tenant information and the authorization data. In step S312, the adapter 111 notifies the tenant device and ends the authorization operation. Thereby, the adapter 111 may effectively establish the authorization basis of the tenant login permission between the first PaaS module 112 and the second PaaS module 113.

Figure 4:
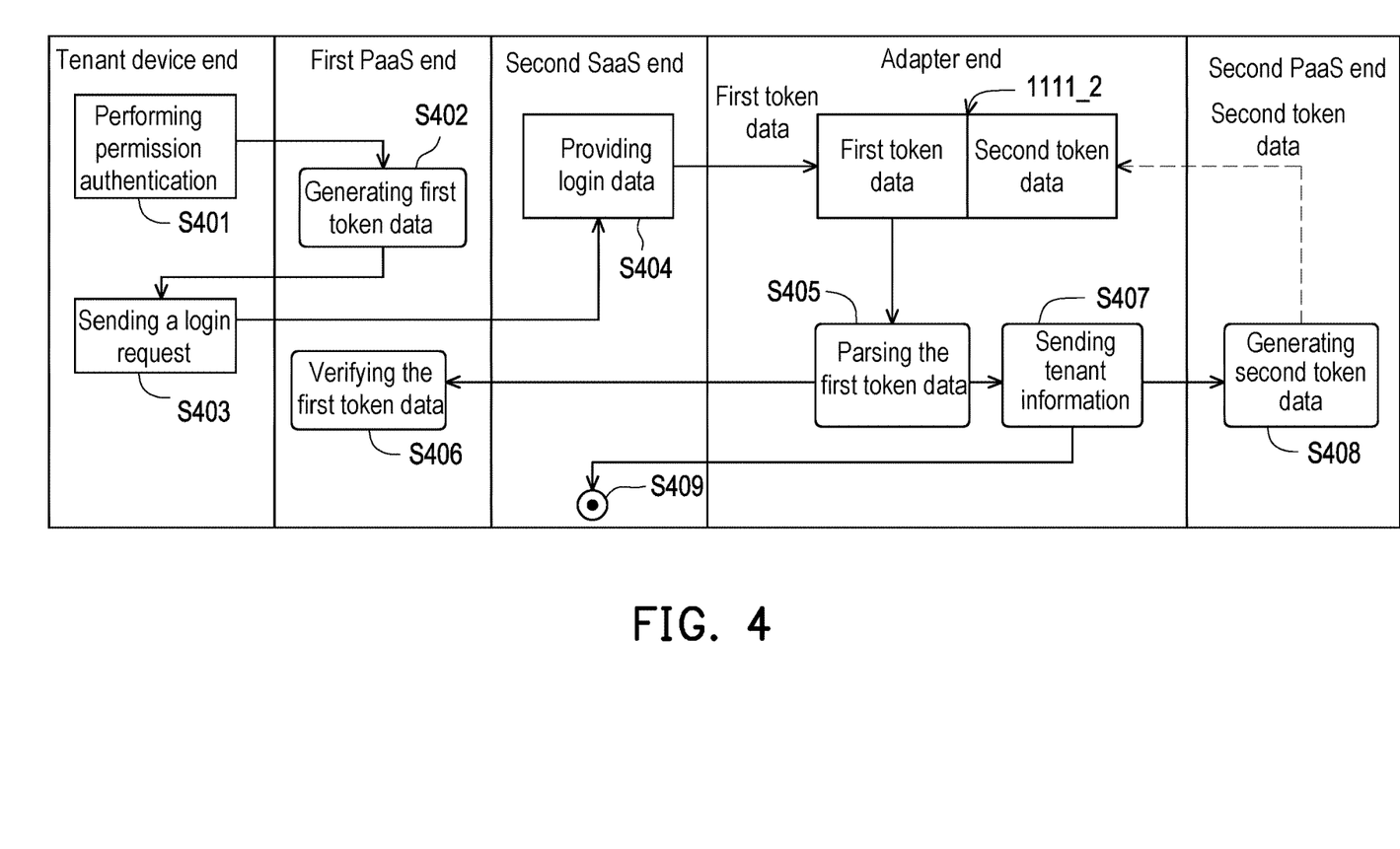
FIG. 4 is a flowchart of a login operation for the first time according to an embodiment of the disclosure.

FIG. 4 is a flowchart of a login operation for the first time according to an embodiment of the disclosure. With reference to FIG. 1 and FIG. 4, the login operation for the first time in the integrated method between multi-cloud applications is elaborated hereinafter in steps S401-S409. In step S401, the tenant may operate the tenant device to connect the first PaaS module 112 for performing permission authentication. In step S402, the first PaaS module 112 may generate first token data, and return the generated first token data to the tenant device. In step S403, the tenant may connect to the second SaaS module 131 by operating the tenant device to send a login request to the second SaaS module 131. The tenant device may send login data including the first token data to the second SaaS module 131. In step S404, the second SaaS module 131 may send the login data including the first token data to the adapter 111, so that the adapter 111 may store the first token data in the token data mapping table 1111_2. In step S405, the token data parser 1111_1 of the adapter 111 parses the first token data to obtain the first token (the first encryption key). The adapter 111 may send the first token data to the first PaaS module 112. In step S406, the first PaaS module 112 may verify the first token data (verify the first encryption key) and log in the first PaaS module 112 and/or the first SaaS module 121 as a permit tenant. In step S407, the adapter 111 may send tenant information to the second PaaS module 113. In step S408, the second PaaS module 113 may generate second token data according to the tenant information and the authorization basis of the tenant login permission established in the embodiment of FIG. 3 above. The second PaaS module 113 may send the second token data to the adapter 111, so that the adapter 111 can store the second token data in the token data mapping table 1111_2, so as to map the second token data to the first token data. In step S409, the adapter 111 may notify the second SaaS module 131, wherein the mapping operation of the completed token data is completed. Thereby, the integrated system 100 may effectively synchronize the tenant identity authentication and the tenant login permission between the first SaaS module 121 and the second SaaS module 131.

Figure 5:
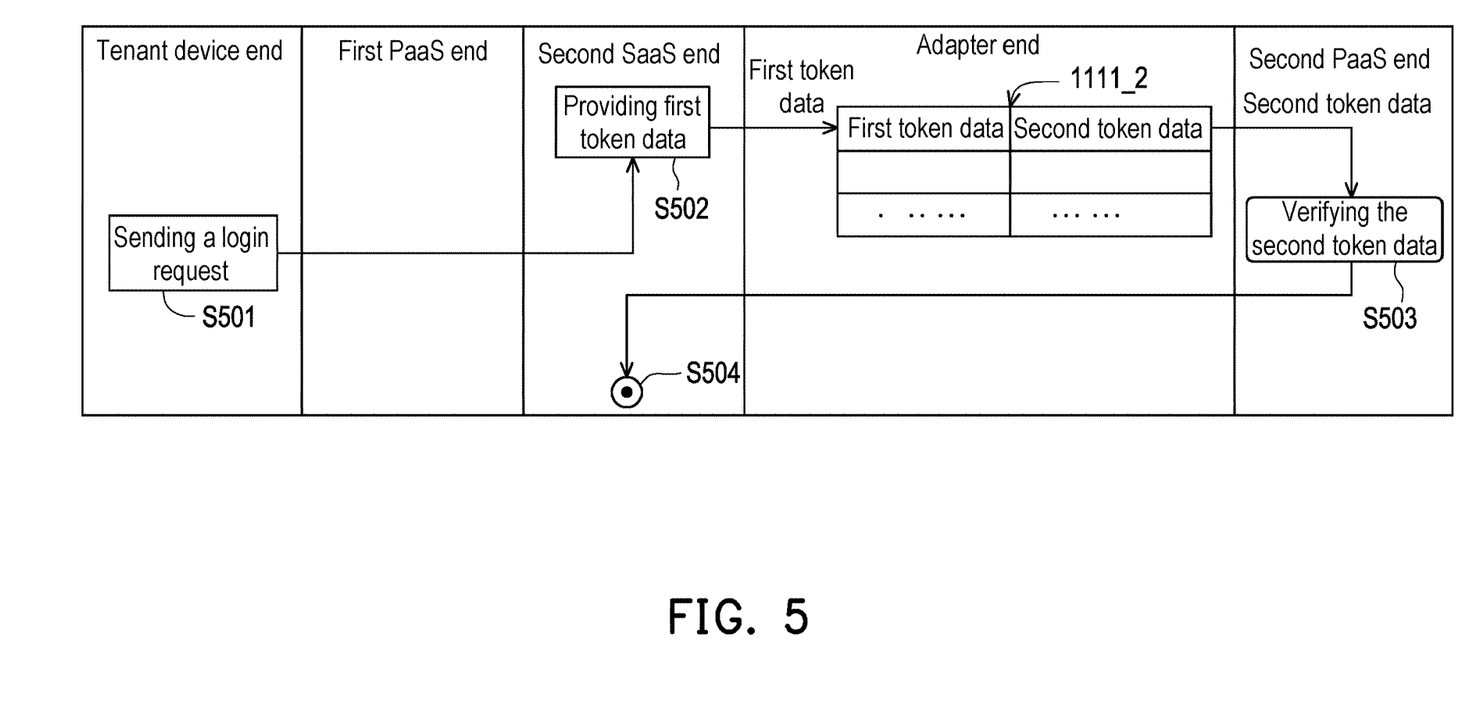
FIG. 5 is a flowchart of a login operation for the second time according to an embodiment of the disclosure.

FIG. 5 is a flowchart of a login operation for the second time according to an embodiment of the disclosure. With reference to FIG. 1 and FIG. 5, the login operation for the second time in the integrated method between multi-cloud applications is elaborated hereinafter in steps S501-S509. In step S501, the tenant may operate the tenant device to connect the second SaaS module 131 for sending a login request to the second SaaS module 131. The tenant device may send the login data including the first token data to the second SaaS module 131 to log in to the second SaaS module 131 again. The second SaaS module 131 may provide the login data to the adapter 111. In step S502, the second SaaS module 131 may send the login data including the first token data to the adapter 111. The adapter 111 may verify and parse the login data to generate the first token data and the tenant information. The adapter 111 may provide the tenant information to the second SaaS module 131. When the adapter 111 determines that the first token data are mapped to the second token data, in step S503, the adapter 111 provides the second token data to the second PaaS module 113 for verification. In step S504, the second PaaS module 113 may notify the second SaaS module 131 of the fact that the second token data pass the verification, so as to allow the tenant device to log in to the second SaaS module 131. Thereby, the tenant may perform application service functions of the first SaaS module 121 and the second SaaS module 131 through the integrated system 100 with ease in a secure manner in no need of performing additional manual authorization and identity authentication operations on the second PaaS module 113 and the second SaaS module 131.

Figure 6:
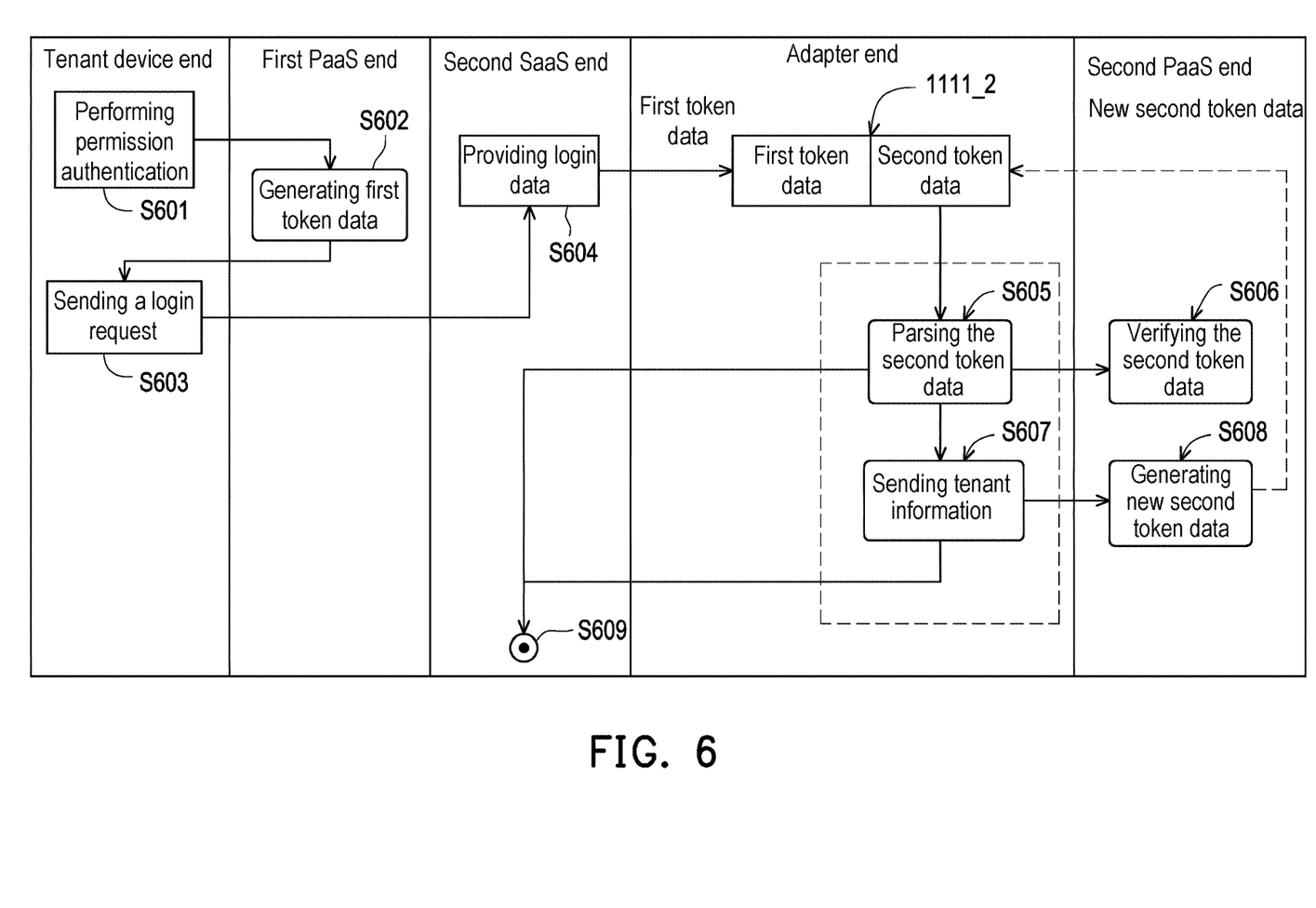
FIG. 6 is a flowchart of a login operation which expires according to an embodiment of the disclosure.

FIG. 6 is a flowchart of a login operation which expires according to an embodiment of the disclosure. With reference to FIG. 1 and FIG. 6, the login operation that expires in the integrated method between multi-cloud applications is elaborated hereinafter in steps S601-S609. In step S601, the tenant may operate the tenant device to connect the first PaaS module 112 for performing permission authentication. In step S602, the first PaaS module 112 may generate the first token data and send the generated first token data to the tenant device. In step S603, the tenant may operate the tenant device to connect the second SaaS module 131 to send a login request to the second SaaS module 131. The tenant device may send the login data including the first token data to the second SaaS module 131. In step S604, the second SaaS module 131 may send the login data including the first token data to the adapter 111. In step S605, the adapter 111 may parse the login data to obtain the first token data and may determine that the first token data are mapped to the second token data. The adapter 111 may first determine whether the second token data expire through the scheduler 1113. The adapter 111 may determine whether the second token data fail according to whether the second token data expire. If the second token data are valid, and the first token data are mapped to the second token data, in step S606, the adapter 111 provides the second token data to the second PaaS module 113 for verification. The second PaaS module 113 may notify the second SaaS module 131 of the fact that the second token data pass the verification, so as to allow the tenant device to log in to the second SaaS module 131. If the second token data fail, and the first token data are mapped to the second token data, in step S607, the adapter 111 may send the tenant information to the second PaaS module 113. In step S608, the second PaaS module 113 may generate new second token data according to the tenant information and the authorization basis of the tenant login permission established in the previous embodiment depicted in FIG. 3. The second PaaS module 113 may send the new second token data to the adapter 111, so that the adapter 111 may store the new second token data in the token data mapping table 1111_2 and map the new second token data to the first token data. In step S609, the adapter 111 may notify the second SaaS module 131 of the fact that the second token data pass the verification, so as to allow the tenant device to log in to the second SaaS module 131; alternatively, the adapter 111 may notify the second SaaS module 131 of the fact that the mapping operation of the token data has been completed. Thereby, the integrated system 100 may effectively synchronize the tenant identity authentication and the tenant login permission between the first SaaS module 121 and the second SaaS module 131 again, so that the tenant device may effectively perform the application service functions of the first SaaS module 121 and the second SaaS module 131 in a secure manner.

To sum up, in the integrated system and the integrated method between the multi-cloud applications provided in one or more embodiments of the disclosure, the adapter may be disposed at the PaaS layer to effectively integrate a plurality of SaaS modules disposed at the SaaS layer. Thereby, the tenant is allowed to log in to the SaaS modules through one single login account in no need of modifying the SaaS modules. Besides, in the integrated system and the integrated method between the multi-cloud applications provided in one or more embodiments of the disclosure, a unified token mapping-scheduling process is applied to integrate a plurality of SaaS modules, so that the PaaS modules and the SaaS modules are not affected. The integrated system and the integrated method between the multi-cloud applications provided in one or more embodiments of the disclosure allow the tenant to perform the application service functions of the SaaS modules with ease in a secure manner.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An integrated system between multi-cloud applications, the integrated system comprising:

a platform server, comprising a hardware processor and a hardware storage device, wherein a memory of the hardware storage device is configured to store an adapter, a first platform-as-a-service module and a second platform-as-a-service module, and the hardware processor is configured to execute the adapter, the first platform-as-a-service module and the second platform-as-a-service module; and the adapter, connected to a first software-as-a-service module and a second software-as-a-service module, the first platform-as-a-service module, connected to the adapter and the first software-as-a-service module; and the second platform-as-a-service module, connected to the adapter and the second software-as-a-service module, wherein when a tenant device accesses the first platform-as-a-service module, so that the first platform-as-a-service module obtains a login request provided by the tenant device, the first platform-as-a-service module generates first token data according to the login request and provides the first token data to the tenant device, wherein when the tenant device provides login data comprising the first token data to the second software-as-a-service module to log in to the second software-as-a-service module for the first time, the second software-as-a-service module provides the login data to the adapter, wherein the adapter verifies and parses the login data to obtain the first token data and tenant information, the adapter obtains second token data through the second platform-as-a-service module according to the tenant information, and the adapter maps the second token data to the first token data, wherein when the tenant device provides the login data comprising the first token data to the second software-as-a-service module, so as to log in to the second software-as-a-service module again, the second software-as-a-service module provides the login data to the adapter, wherein the adapter verifies and parses the login data to obtain the first token data and the tenant information, the adapter provides the tenant information to the second software-as-a-service module, and when the adapter determines that the first token data are mapped to the second token data, the adapter provides the second token data to the second platform-as-a-service module for verification, wherein when the second token data pass the verification, the second platform-as-a-service module notifies the second software-as-a-service module to permit the tenant device to log in to the second software-as-a-service module, wherein when the tenant device provides the login data comprising the first token data to the second software-as-a-service module, so as to log in to the second software-as-a-service module again, the second software-as-a-service module provides the login data to the adapter, wherein the adapter verifies and parses the login data to generate the first token data and the tenant information, and when the adapter determines that the first token data are mapped to the second token data, and the second token data fail to be verified, the adapter obtains another second token data through the second platform-as-a-service module according to the tenant information, and the adapter maps the another second token data to the first token data.

2. The integrated system between the multi-cloud applications according to claim 1, wherein the first token data comprise a first encryption key and the tenant information, and the second token data comprise a second encryption key and the tenant information.

3. The integrated system between the multi-cloud applications according to claim 1, wherein the adapter determines that the second token data fail verification according to whether the second token data expire.

4. The integrated system between the multi-cloud applications according to claim 1, wherein before the tenant device accesses and logs in to the first platform-as-a-service module, the tenant device provides an authorization request to the first platform-as-a-service module, and the first platform-as-a-service module provides the authorization request to the adapter, so that the adapter notifies the second platform-as-a-service module to determine whether the tenant device is authorized, wherein when the adapter determines that the tenant device is not authorized, the adapter provides access information of the tenant device to the second platform-as-a-service module for performing an authorization operation.

5. The integrated system between the multi-cloud applications according to claim 4, wherein the adapter adds management authorization information to the access information, so that the second platform-as-a-service module performs an administrator authorization operation.

6. The integrated system between the multi-cloud applications according to claim 4, wherein the second platform-as-a-service module performs the authorization operation to provide permission data to the adapter, and the adapter provides the permission data to the tenant device.

7. An integrated method between multi-cloud applications, the integrated method comprising:
 when a tenant device accesses a first platform-as-a-service module, obtaining by the first platform-as-a-service module a login request provided by the tenant device;
 generating first token data according to the login request by the first platform-as-a-service module;
 providing the first token data to the tenant device by the first platform-as-a-service module;
 when the tenant device provides login data comprising the first token data to a second software-as-a-service module to log in to the second software-as-a-service module for the first time, providing the login data to an adapter by the second software-as-a-service module;
 verifying and parsing the login data by the adapter to obtain the first token data and tenant information;
 obtaining by the adapter second token data through a second platform-as-a-service module according to the tenant information;
 mapping the second token data to the first token data by the adapter;
 when the tenant device provides the login data comprising the first token data to the second software-as-a-service module to log in to the second software-as-a-service module again, providing the login data to the adapter by the second software-as-a-service module;
 verifying and parsing the login data by the adapter to obtain the first token data and the tenant information;
 providing the tenant information to the second software-as-a-service module by the adapter;
 when the adapter determines that the first token data are mapped to the second token data, providing by the adapter the second token data to the second platform-as-a-service module for verification;
 when the second token data pass the verification, notifying the second software-as-a-service module by the second platform-as-a-service module to permit the tenant device to log in to the second software-as-a-service module;
 when the tenant device provides the login data comprising the first token data to the second software-as-a-service module to log in to the second software-as-a-service module again, providing the login data to the adapter by the second software-as-a-service module;
 verifying and parsing the login data by the adapter to obtain the first token data and the tenant information;
 providing the tenant information to the second software-as-a-service module by the adapter;
 when the adapter determines that the first token data are mapped to the second token data, and the second token data fail to be verified, obtaining by the adapter another second token data through the second platform-as-a-service module according to the tenant information; and
 mapping the another second token data to the first token data by the adapter.

8. The integrated method between the multi-cloud applications according to claim 7, wherein the first token data comprise a first encryption key and the tenant information, and the second token data comprise a second encryption key and the tenant information.

9. The integrated method between the multi-cloud applications according to claim 7, wherein the adapter determines that the second token data fail verification according to whether the second token data expire.

10. The integrated method between the multi-cloud applications according to claim 7, further comprising:
 before the tenant device accesses and logs in to the first platform-as-a-service module, providing by the tenant device an authorization request to the first platform-as-a-service module;
 providing the authorization request to the adapter by the first platform-as-a-service module, so that the adapter notifies the second platform-as-a-service module to determine whether the tenant device is authorized; and
 when the adapter determines that the tenant device is not authorized, providing access information of the tenant device to the second platform-as-a-service module by the adapter for performing an authorization operation.

11. The integrated method between the multi-cloud applications according to claim 10, wherein the adapter adds administration authorization information to the access information, so that the second platform-as-a-service module performs an administrator authorization operation.

12. The integrated method between the multi-cloud applications according to claim 10, further comprising:
 performing an authorization operation by the second platform-as-a-service module to provide permission data to the adapter; and
 providing the permission data to the tenant device by the adapter.

* * * * *